(12) United States Patent
Inzinga et al.

(10) Patent No.: US 7,599,820 B2
(45) Date of Patent: Oct. 6, 2009

(54) GRAPHICAL USER INTERFACE FOR INTERACTIVE CONSTRUCTION OF TYPICAL CROSS-SECTION FRAMEWORKS

(75) Inventors: Thomas M. Inzinga, Henniker, NH (US); Lisa E. Fox, Sandown, NH (US); Kumud D. Valdya, Penacook, NH (US); Bradford V. Ek, Jr., Concord, NH (US); Nagesh Narayanaswamy, Manchester, NH (US); Chakravarthy Gavini, Amherst, NH (US)

(73) Assignee: Autodesk, Inc., San Rafael, CA (US)

( * ) Notice: Subject to any disclaimer, the term of this patent is extended or adjusted under 35 U.S.C. 154(b) by 728 days.

(21) Appl. No.: 11/165,319

(22) Filed: Jun. 23, 2005

(65) Prior Publication Data

US 2008/0027684 A1 Jan. 31, 2008

(51) Int. Cl.
*G06F 17/50* (2006.01)
(52) U.S. Cl. ............. 703/1; 703/2; 703/6; 700/98; 345/419
(58) Field of Classification Search .......... 703/1, 703/2, 6, 26; 345/420, 419, 619, 964; 700/98; 433/24; 228/102; 52/612, 505
See application file for complete search history.

(56) References Cited

U.S. PATENT DOCUMENTS

| | | | |
|---|---|---|---|
| 6,925,344 B1 * | 8/2005 | Lambert et al. | 700/98 |
| 6,944,580 B1 * | 9/2005 | Blume et al. | 703/1 |
| 6,996,507 B1 * | 2/2006 | Myr | 703/2 |
| 7,006,956 B1 * | 2/2006 | Gerlovin et al. | 703/6 |
| 7,312,802 B2 * | 12/2007 | Komornicki et al. | 345/619 |
| 7,324,102 B2 * | 1/2008 | Inzinga et al. | 345/419 |
| 2002/0069603 A1 * | 6/2002 | Zornes | 52/612 |
| 2002/0123812 A1 * | 9/2002 | Jayaram et al. | 700/98 |
| 2003/0193499 A1 * | 10/2003 | Gao | 345/420 |
| 2004/0128120 A1 * | 7/2004 | Coburn et al. | 703/26 |
| 2004/0145614 A1 * | 7/2004 | Takagaki et al. | 345/964 |
| 2004/0197727 A1 * | 10/2004 | Sachdeva et al. | 433/24 |
| 2004/0237439 A1 * | 12/2004 | Powell | 052/505 |
| 2005/0045691 A1 * | 3/2005 | Blankenship et al. | 228/102 |
| 2005/0285855 A1 * | 12/2005 | Chien et al. | 345/419 |

* cited by examiner

*Primary Examiner*—Paul L Rodriguez
*Assistant Examiner*—Kandasamy Thangavelu
(74) *Attorney, Agent, or Firm*—Patterson & Sheridan, LLP.

(57) ABSTRACT

Embodiments of the invention provide a method, apparatus and article of manufacture for modeling a variety of three dimensional structures that may be represented as a longitudinal series of repeating cross-sections. In one embodiment, users construct each cross section from a collection of subassembly components selected from a catalog of subassemblies. Each subassembly is represented as a data component that stores modifiable parameters, and a logic component that generates a parameter-specific geometry of the subassembly for use in a cross-section of the model. A graphical user interface allows a user to select a subassembly, to modify the parameters for the subassembly, and to integrate the subassembly element into the computer model.

18 Claims, 8 Drawing Sheets

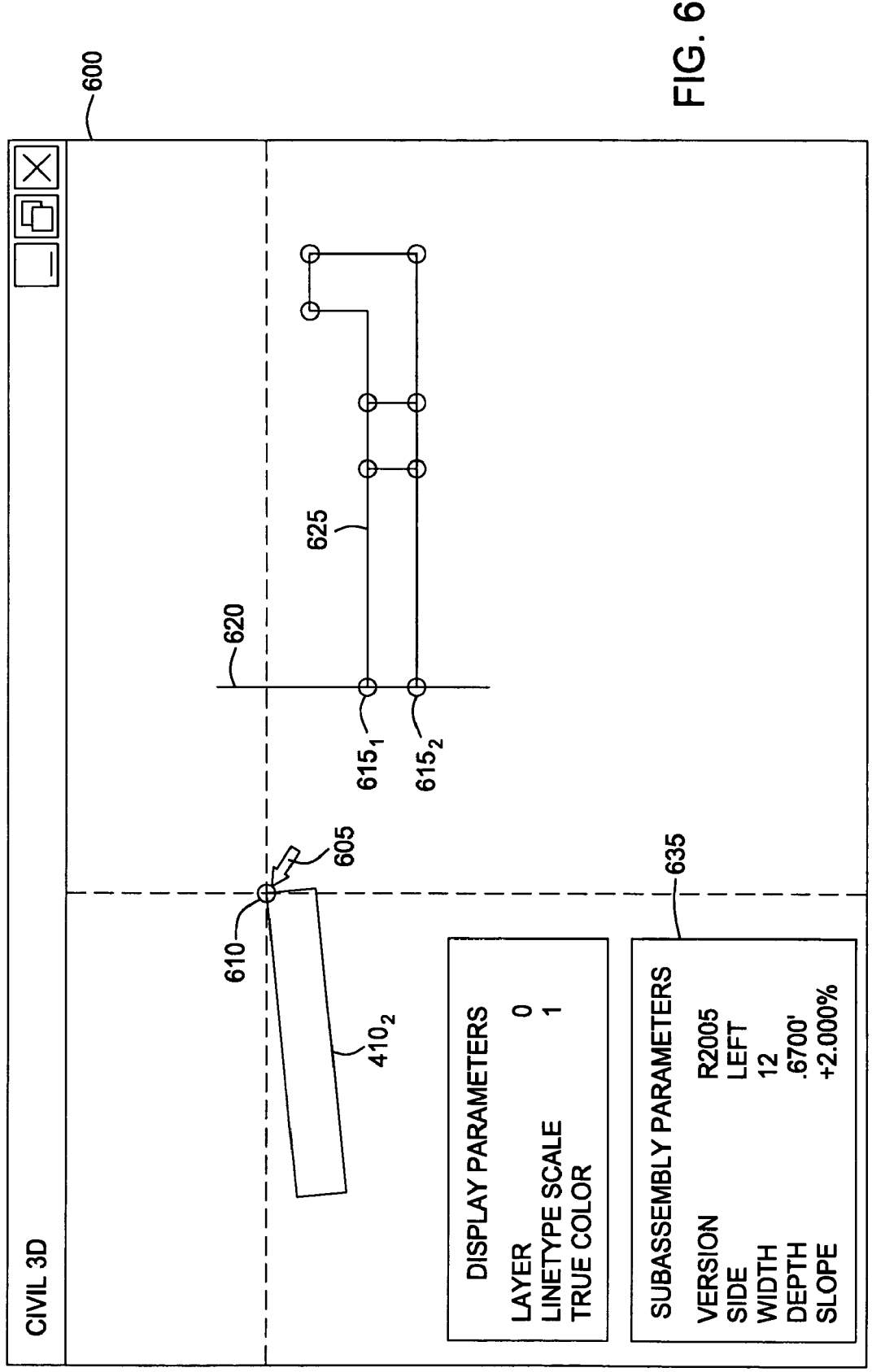

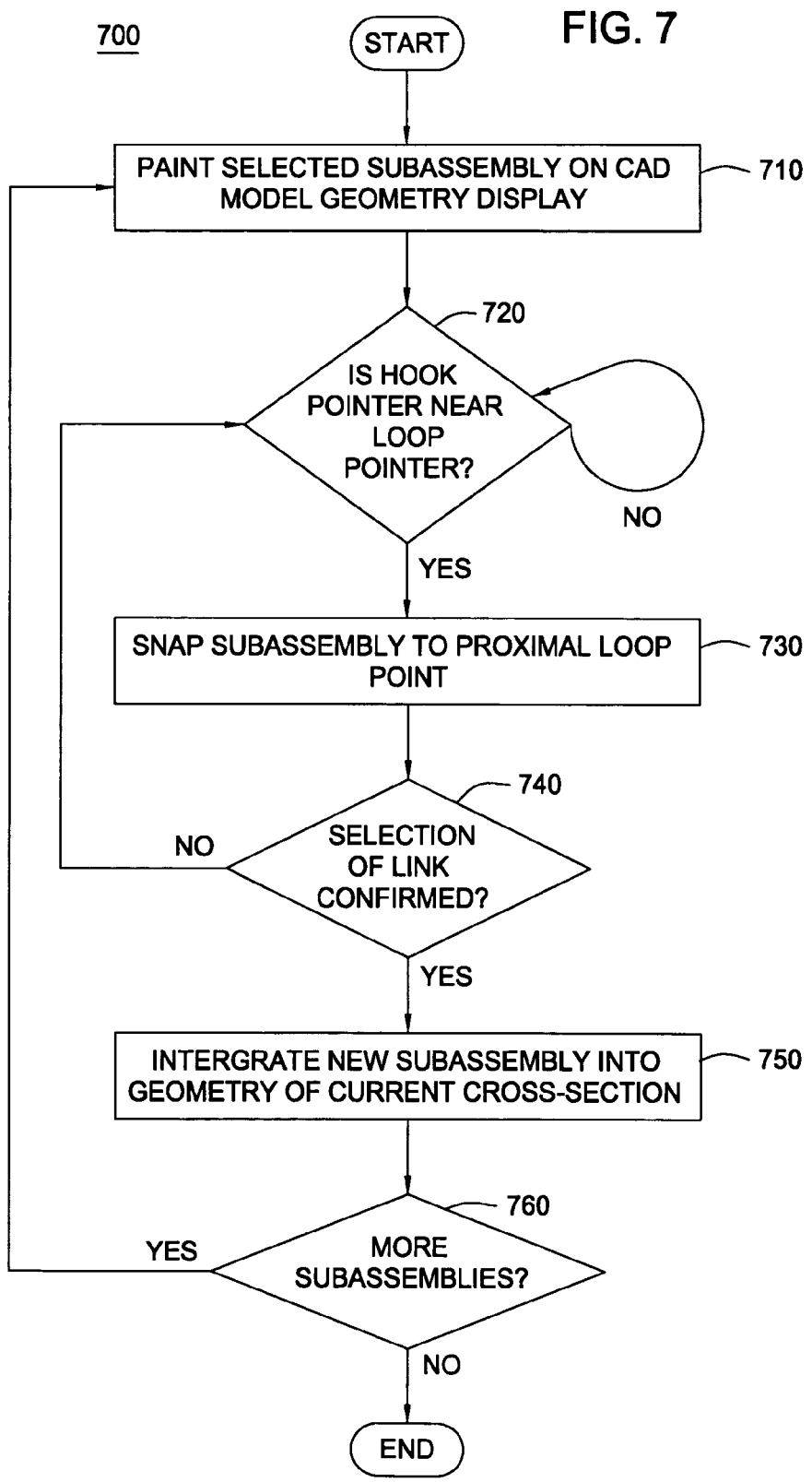

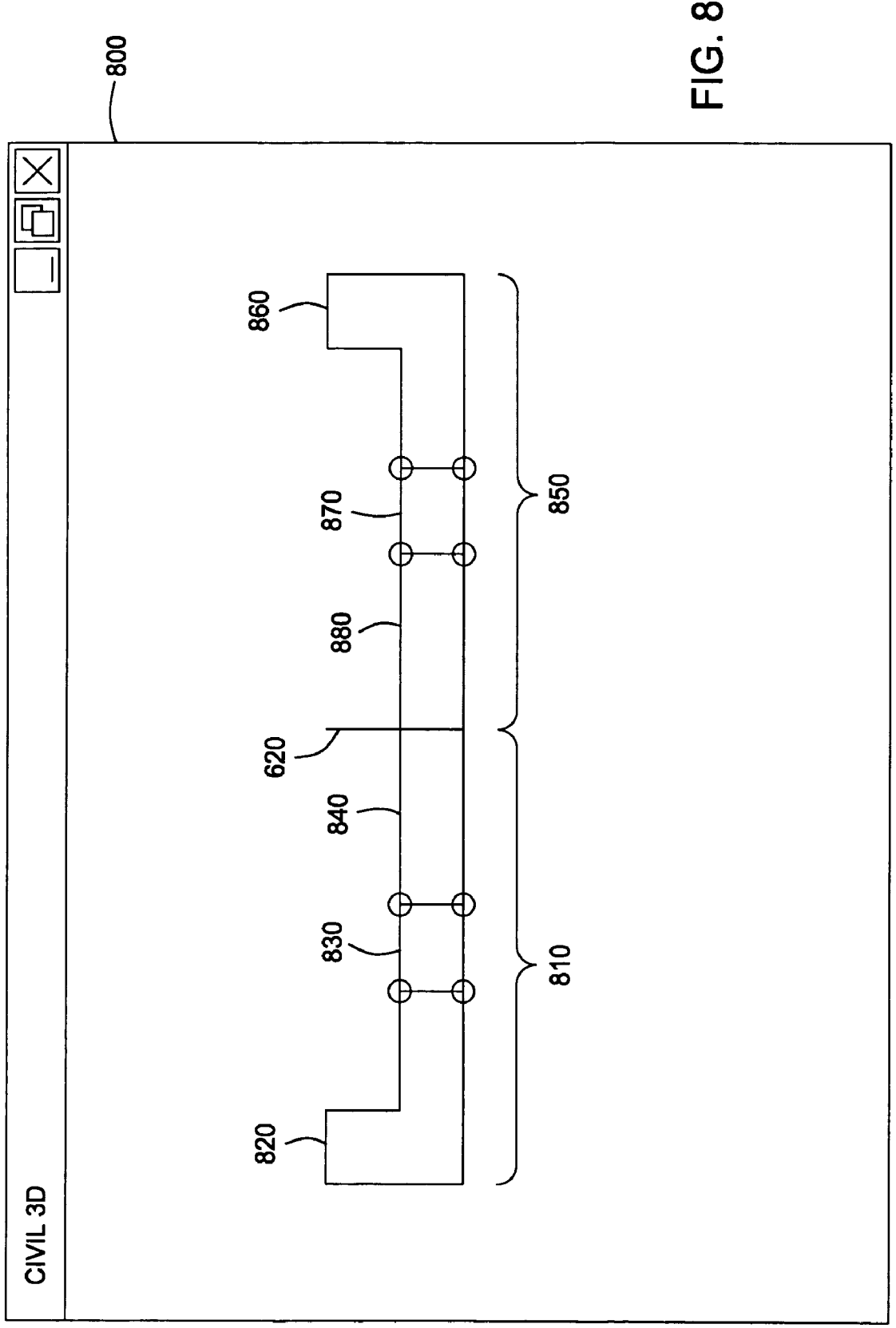

GRAPHICAL USER INTERFACE FOR INTERACTIVE CONSTRUCTION OF TYPICAL CROSS-SECTION FRAMEWORKS

BACKGROUND OF THE INVENTION

1. Field of the Invention

The present invention generally relates to computer software. More specifically, the present invention relates to a computer software application that facilitates the interactive design of three dimensional (3-D) structures based on cross-section frameworks.

2. Description of the Related Art

Currently, computer aided design (CAD) applications are available that allow a designer or engineer to build a computer model of a real-world 3-D object. Such models are generally based on the real-world geometry of the object being modeled.

Many real-world structures may be modeled as a longitudinal structure, composed from a series of repeating cross-sectional elements. For example, a CAD model of road may be modeled as a series of individual cross-sections, and each cross-section may be specified by a collection of parameters that specify the geometry and characteristics of the cross-section. In addition to roadway lanes, other examples of structures that may be modeled as a series of repeating cross-sections include, sidewalks, tunnels, dams, bridges, runways, pipelines, individual pipes, and the like.

Accordingly, some current CAD applications allow users to generate a 3-D model using a series of cross-section elements integrated into a single a longitudinal structure. In most cases, however, the cross-section elements that may be placed into the CAD model are limited to those provided by the particular CAD application. Given the virtually infinite variety of real world variation that occurs in the actual cross-sections of these structures, however, the unavailability of an adequate number of cross-sections has, historically, been a severe limitation on the usefulness of current CAD applications.

At the same time, simply providing additional cross-section elements for a CAD application has proven to be both cost prohibitive and time consuming. Further, efforts to provide users with a CAD application that allows a designer to specify each cross-section with the required real-word variation has led to overly complex CAD applications that have been difficult and cumbersome for designers to use. Hence, these CAD applications have failed to gain widespread acceptance.

Accordingly, there remains a need for an improved CAD application that allows a designer to generate a model of a 3-D longitudinal structure as a series of repeating cross-sectional elements. Preferably, such a CAD application would allow users to create cross-sectional elements with enough variety so as to be useful in modeling real-world structures, without requiring a system that defines all of the different possible cross-section elements in advance, and without exhibiting the complexity present in current systems.

SUMMARY OF THE INVENTION

Embodiments of the invention provide an intuitive, simple, yet effective means for building a CAD model of real-world physical structures modeled using a series of repeating cross-sectional elements.

One embodiment of the invention provides a method for building a computer model of a longitudinal structure using a graphical user interface display. The method generally includes providing a catalog of subassemblies, wherein each subassembly is represented as a data component that stores modifiable parameters, and a logic component that generates a parameter-specific geometry of the subassembly for use in a cross-section of the model. Once a subassembly is selected for the model, the method generally further includes, executing the logic component to generate the parameter-specific geometry for the subassembly and integrating the subassembly into the cross-section of the model, based on the parameter-specific geometry.

The parameter-specific geometry of the subassembly may include point, link, and shape information generated from the modifiable parameters by the logic component. In one embodiment, point information specifies locations on the subassembly where the subassembly may be connected to other subassemblies, link information specifies linear connectivity between at least two point locations of the subassembly, and shape information defines at least one closed shape formed from the link information.

In building a particular longitudinal structure, users may be provided a catalog of subassemblies appropriate for the structure. The catalog may be displayed to a user by displaying an on-screen image that represents each subassembly. In one embodiment, subassemblies are placed into the computer model by aligning an on-screen display image of a first subassembly's hook point to a loop point of a second subassembly present in the model. Further, the graphical user interface may be configured to snap the on-screen display image of the subassembly hook point defined for the first subassembly to a loop point of the second subassembly whenever the hook point is moved to a location within a specified distance from the loop point of the second subassembly.

Another embodiment of the invention provides a computer-readable medium containing a program, which when executed by a processor, performs an operation for building a computer model of a longitudinal structure. The operations generally include providing a catalog of subassemblies, wherein each subassembly is represented as a data component that stores modifiable parameters, and a logic component that generates a parameter-specific geometry of the subassembly for use in a cross-section of the model, and providing a graphical user interface that allows a user to select a subassembly, to modify the parameters for the subassembly, and to integrate the subassembly into the computer model.

Another embodiment of the invention provides a computer aided design (CAD) system for building a CAD model of a longitudinal structure. The system generally includes a design application program, a subassembly database wherein each subassembly in the database includes a data component that stores modifiable parameters, and a logic component that generates a parameter-specific geometry of the subassembly for use in a cross-section of the model. The system also generally includes a computer model database, wherein the computer model database stores the parameter specific geometry of each subassembly of the cross sections of the model. The system generally further includes a graphical user interface configured to allow a user to drag and drop an on-screen image representing a subassembly, selected from a catalog display of subassemblies, into an existing computer model.

BRIEF DESCRIPTION OF THE DRAWINGS

So that the manner in which embodiments of the present invention may be understood in detail, a more detailed description of the invention, briefly summarized above, may be had by reference to the appended drawings. These drawings, however, illustrate typical embodiments of the invention and are not meant to be limiting of its scope, for the invention may admit to other equally effective embodiments.

FIG. 6 illustrates an exemplary graphical user interface screen for adding a subassembly element to computer model of a longitudinal structure, according to one embodiment of the invention.

FIG. 7 is a flow chart illustrating a method for integrating a subassembly element into a computer model of a longitudinal structure, according to one embodiment of the invention.

FIG. 8 illustrates an exemplary graphical user interface screen that shows a completed cross-section assembly, composed from a set of subassembly elements, according to one embodiment of the invention.

DETAILED DESCRIPTION OF THE PREFERRED EMBODIMENTS

Embodiments of the invention allow users of a CAD application to build computer models of longitudinal structures that may be represented as a collection of individual cross-sections. Each individual cross-section may include a number of subassemblies that define the geometry and characteristics of the cross-section. In one embodiment, a graphical user interface displays a catalog of basic subassembly elements. Each basic subassembly may include a default set of geometry parameters and a logic component configured to generate the actual geometry for the subassembly when it is included in a CAD model. Users may modify these parameters when adding a basic subassembly to a CAD model to account for the variation that occurs in real-world structures. In one embodiment, a user adds a basic subassembly to a model by dragging and dropping an image of the basic subassembly from a catalog display into an on-screen, cross sectional representation of the longitudinal structure being modeled. Doing so triggers the logic component defined for the subassembly to generate the CAD model geometry for the subassembly using the geometric parameters. After the user has selected a location within the existing CAD model to place the subassembly, the CAD application integrates the subassembly into the geometry of the overall longitudinal structure being modeled.

For purposes of illustration, examples are described herein with reference to building a CAD model of a cross-section of a simple two lane roadway. As described above, however, the CAD application described herein may be used to model any 3-D object capable of being represented as a longitudinal structure composed from a series of repeating cross-sections. In one embodiment of the present invention, a computer-readable medium containing a program that when executed by a processor, performs operations for building a computer model of a longitudinal structure by providing a catalog of subassemblies, where each subassembly is represented as a data component that stores modifiable parameters, and a logic component that generates a parameter-specific geometry of the subassembly for use in a cross-section of the model, and providing a graphical user interface that allows a user to select a subassembly, to modify the parameters for the subassembly, and to integrate the subassembly into the computer model.

The term "computer-readable medium" as used herein refers to any medium that participates in providing instructions for execution by a processor. Such a medium may take many forms, including but not limited to, non-volatile media and volatile media. Non-volatile media includes, for example, optical or magnetic disks. Volatile media includes dynamic memory.

Figure 1:
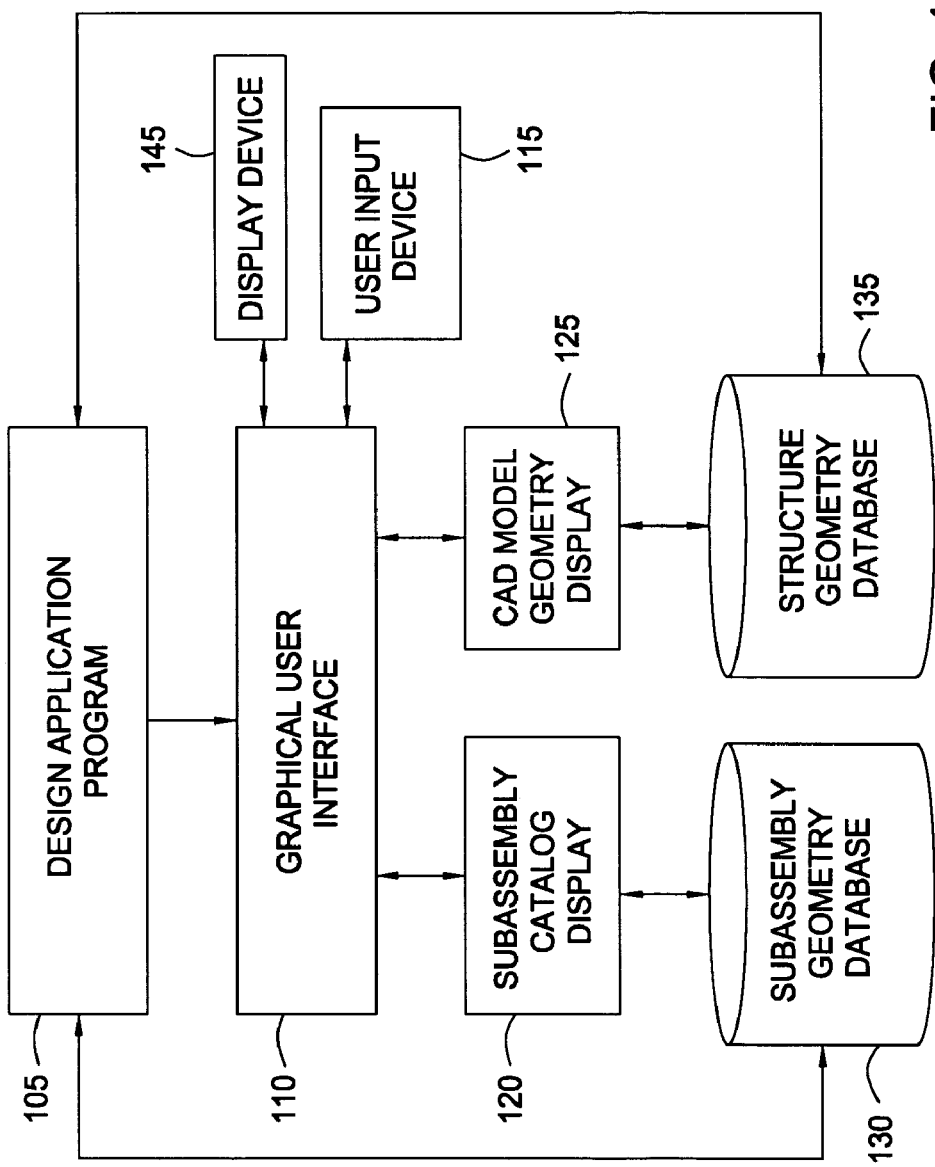
FIG. 1 is a functional block diagram illustrating a system for generating a computer model of a longitudinal structure, according to one embodiment of the invention.

FIG. 1 is a functional block diagram illustrating a CAD environment 100 for generating a CAD model of a longitudinal structure, according to one embodiment of the invention. In one embodiment, the components provided by environment 100 may be computer software applications executing on a computer system such as a desktop computer, server, laptop computer, tablet computer, or the like. As shown, the CAD environment 100 includes, without limitation, a design application program 105, a graphical user interface 110, a user input device 115, a subassembly catalog display 120, a CAD model geometry display 125, a basic subassembly data 130, and a modeled structure geometry data 135. Additionally, the components illustrated in FIG. 1 may be present on multiple systems communicating over computer networks including local area networks or disparate wide area networks such as the Internet. For example, the graphical user interface 110 and the design application 105 may be processes executing on a client computer in communication with databases 130 and 135 executing on networked server computer.

In one embodiment, the design application program 105 is a computer program configured to generate the CAD model, such as the Civil 3D® application program and associated utilities available from AutoDesk, Inc. The CAD model defines the alignment, characteristics, and geometry of the 3-D structure represented by the CAD model. The geometry of the structure being modeled, and its constituent subassembly components, may be displayed on graphical user interface 110 connected to a display device 145. The subassembly catalog display 120 provides an on-screen display of basic subassembly elements that may be used to build each cross-section of the CAD model. As a user selects to add additional subassembly elements to the CAD model, the model geometry display 125 updates the display of the CAD model presented to the user. Geometry structure data 135 for the CAD model may be stored in structure geometry database 135.

User input device 115 allows users to select which subassembly elements to add to a cross-section and to select a location within a current cross-section to position the subassembly. Typically, user input devices 115 may include a mouse pointing device and a keyboard to manipulate graphical user interface 110.

Figure 2:
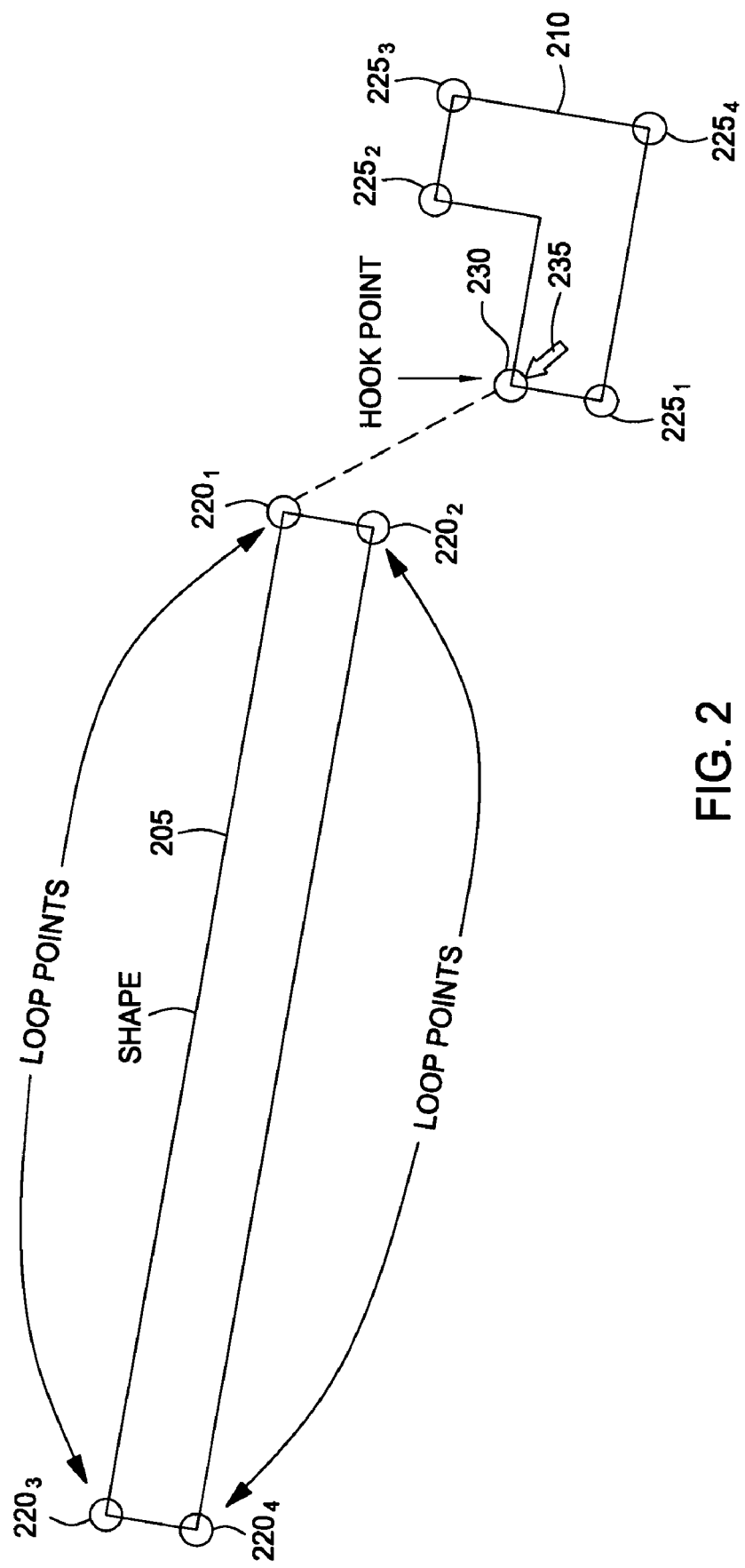
FIG. 2 illustrates an exemplary screen display of a subassembly element that may be connected to the geometry of an existing CAD model, according to one embodiment of the invention.

In one embodiment, each subassembly includes point, link, and shape information that defines the geometry for a given subassembly. Generally, point information specifies locations on a subassembly where it may be connected with other subassemblies. In one embodiment, the logic component may be configured to generate point information that provides the coordinate locations for a point within in a given geometry. Link information specifies how points are connected together within a given geometry. Thus, link information indicates the connectivity between a pair of points. Shape information defines one or more closed shapes formed from the link information for a given subassembly, or group of subassemblies. Shape information may be used in certain engineering calculations related to the geometry being modeled, e.g., the volume of asphalt required to construct a given cross section of roadway lane, or the length of a gutter defined by multiple cross-sections of the geometry FIG. 2 illustrates a CAD model that includes the point, link and shape information for a roadway lane subassembly 205, along with a curb and gutter subassembly 210, according to one embodiment of the invention. As shown, the current cross-section includes roadway lane subassembly 205. The roadway lane subassembly 205 includes loop points $220_{1-4}$, used to align additional subassemblies dragged into the display of the current cross-section of the CAD model. For example, curb and gutter subassembly 210 may be added to the current cross-section by aligning curb and gutter hook point 230 with loop point $220_1$ of subassembly 205. In one embodiment, each basic subassembly may be configured to include a hook point 230 that provides the focus for adding the subassembly element to the geometry of an existing CAD model.

The mouse cursor 235 is illustrated positioned at hook point 230. A user moves the mouse cursor 235 to link the hook point 230 of subassembly 210 with the desired loop point within the existing CAD model displayed on model geometry display 125. Loop points may be connected together to form a link between subassembly elements (e.g., hook point 230 may be connected to loop point $220_1$). Once a new subassembly is added, the loop points of the newly added subassembly serve as attachment points for additional subassemblies. A group of linked subassembly elements form a series of closed shapes (i.e., the geometry for a cross-section) that follows from the shape information defined for each subassembly included in a particular cross-section. In one embodiment, a cross-section includes a left group and a right group (e.g., to represent the left and right sides of a roadway cross-section.) Each cross-section, however, may include an arbitrary number of groups, each containing an arbitrary number of subassemblies. For example, after adding curb and gutter subassembly 210, a user might select to add a sidewalk subassembly to loop point $225_3$.

Figure 3:
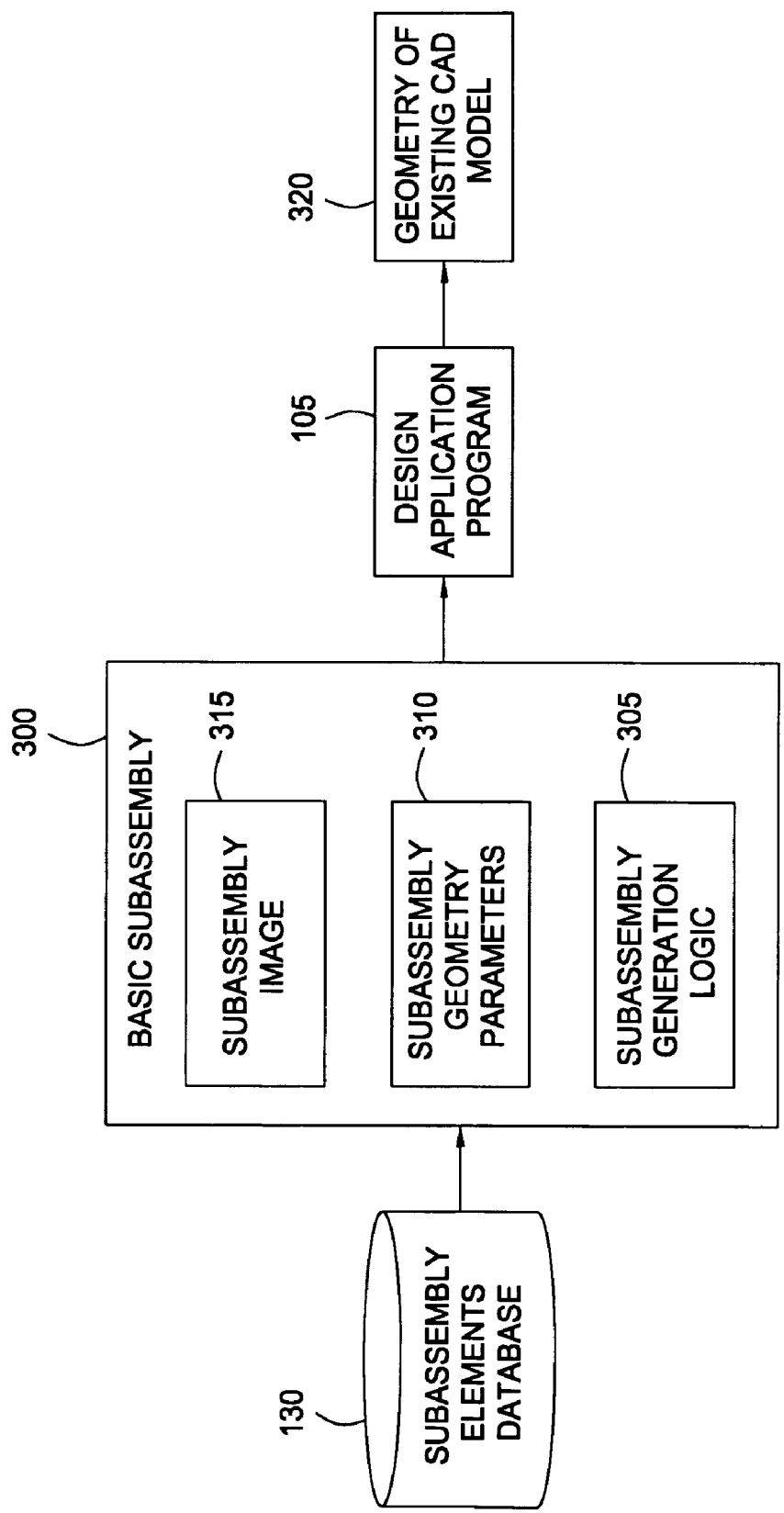
FIG. 3 is a functional block diagram illustrating components of a subassembly element, according to one embodiment of the invention.

FIG. 3 illustrates an implementation of a subassembly element, according to one embodiment of the invention. As illustrated, subassembly element 300 includes three components: subassembly generation logic 305, subassembly geometry parameters 310, and subassembly image 315. In one embodiment, the basic subassembly elements available for a particular CAD model (e.g., a road, a runway, a tunnel, and the like) may be stored in subassembly database 130. The subassembly image 315 presents an on-screen representation of the subassembly in the subassembly catalog display 120. The images identify different subassemblies to a user. The actual geometry for a particular subassembly in an existing CAD model 320, however, is generated from subassembly geometry parameters 310. When a user selects to add a subassembly to a CAD model, the geometry for the subassembly in the CAD model 320 is generated by passing subassembly geometry parameters 310 to subassembly generation logic 305. The subassembly generation logic is then invoked to generate the requested geometry data used by design application program 105.

In one embodiment, the subassembly generation logic 305 may be implemented as a macro composed using Visual Basic® for Applications (VBA). The parameters 310 store dimension related values that are supplied to the generation logic 305. For example, the single lane subassembly element 205 illustrated in FIG. 2 may allow users to define the configuration of 8, 10 and 12 foot wide lanes. In addition, the subassembly generation logic 305 generate the locations of the loop points and hook points for a given basic subassembly 300. In one embodiment, the subassembly geometry parameters 310 store default values for key aspects of the subassembly that are passed to the generation logic 305. That is, the subassembly parameters define the basic features for a particular subassembly, and allow users to define a specific version of the subassembly by modifying the parameters as needed. In a particular embodiment, parameters 310 may be represented using an XML document.

During the drag-and-drop addition of basic subassemblies 300 into an existing CAD model 320, parameters are read from the geometry parameters 310 and passed to the generation logic 305 (e.g., a VBA macro). In turn, the generation logic 305 may be configured to generate a subassembly object with the requested geometry that may be integrated into an existing CAD model 320.

Repeating this process for multiple subassemblies allows users to create each cross-section, and ultimately, the entire CAD model of a longitudinal structure. Further, by modifying the parameters for each basic subassembly 300, users can create useful CAD models of real-world structures. In one embodiment, the subassembly database 130 may include a default collection of basic subassemblies 300. Users may modify the geometry of a basic subassembly 300 by changing geometry parameters 310. For example, a user may select to change the parameter for a roadway lane subassembly 205 to specify a 12 foot wide lane geometry instead of a 10 foot wide lane geometry. Further, by modifying subassembly generation logic 305, users may extend the variety of basic subassembly components available to construct a CAD model 320 in virtually infinite ways, all without sacrificing the usefulness of the drag-and-drop interface.

Figure 4:
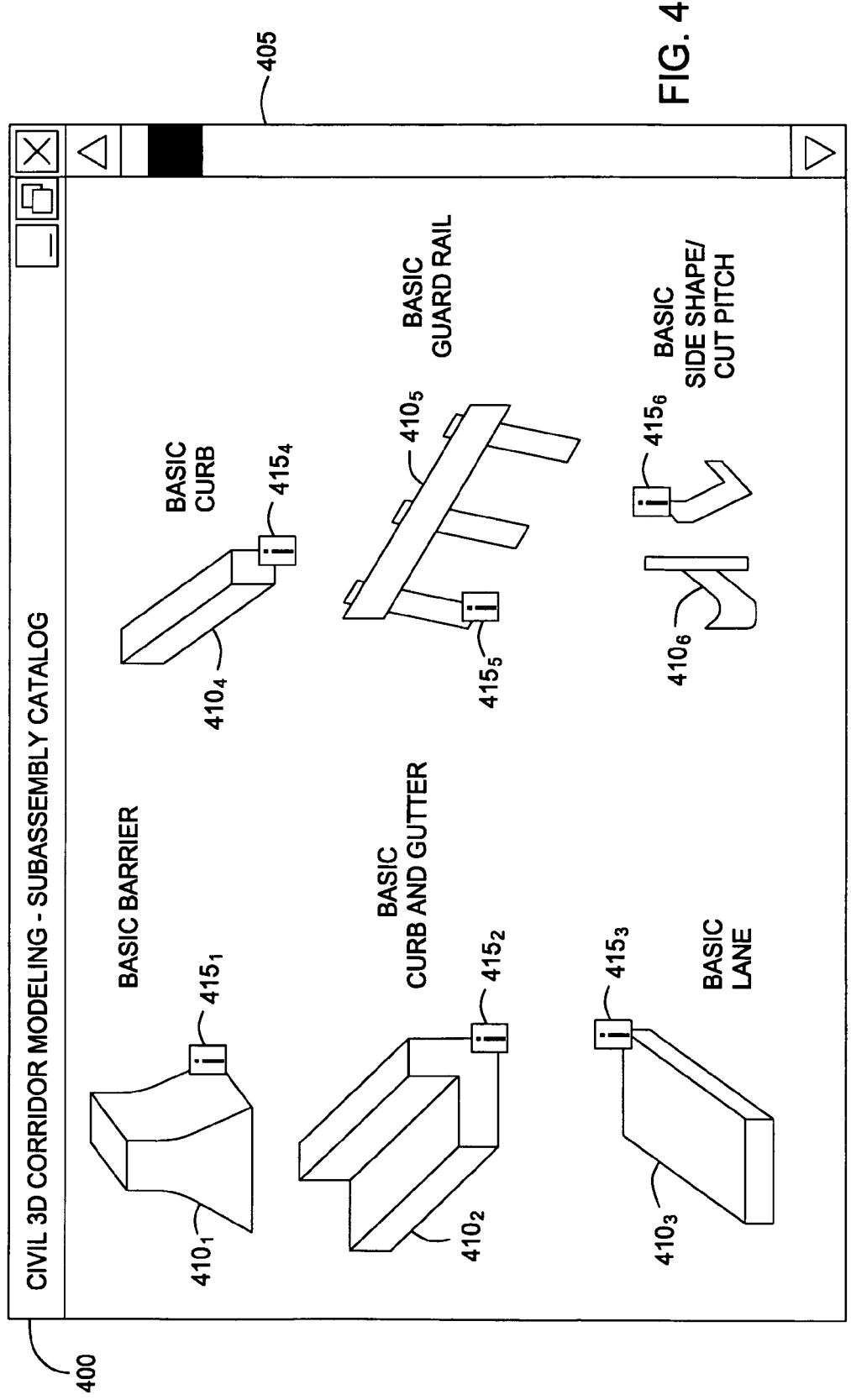
FIG. 4 illustrates an exemplary graphical user interface screen that includes a catalog of subassembly elements, according to one embodiment of the invention.

FIG. 4 illustrates an exemplary graphical user interface screen 400 that displays a catalog of subassembly elements, according to one embodiment of the invention. The screen 400 displays each of the basic subassemblies available to include within the geometry of an existing CAD model. The catalog displays the subassembly image 315 associated with each individual subassembly included in the catalog. If more subassemblies are available than may be reasonably viewed on catalog display 120, scroll bar 450 may be used to scroll through the available subassemblies.

Illustratively, the screen 400 includes basic subassembly elements used to construct a cross-section of a roadway. Thus, the screen displays subassembly images for a barrier subassembly $410_1$, a lane subassembly $410_2$, a curb and gutter subassembly $410_3$, a curb subassembly $410_4$, a guard rail subassembly $410_5$ and a side ditch subassembly $410_6$. In one embodiment, each subassembly is represented using subassembly image 315. In addition to being displayed on screen 400, each basic subassembly 410 may be selected by input device 115 and integrated into an existing CAD model 320 using a drag-and-drop mechanism. In one embodiment, the catalog assembly uses I-drop® technology as described in commonly owned, U.S. patent application Ser. No. 09/479,606 the relevant teachings of which are hereby incorporated by reference. The i-drop mechanism allows a user to select a subassembly from the display catalog 120 using one of the i-drop icons $415_{1-6}$ and drop the selected subassembly into the geometry of an existing CAD model 320. In other embodiments, other known drag-and-drop functionalities may be implemented.

Figure 5:
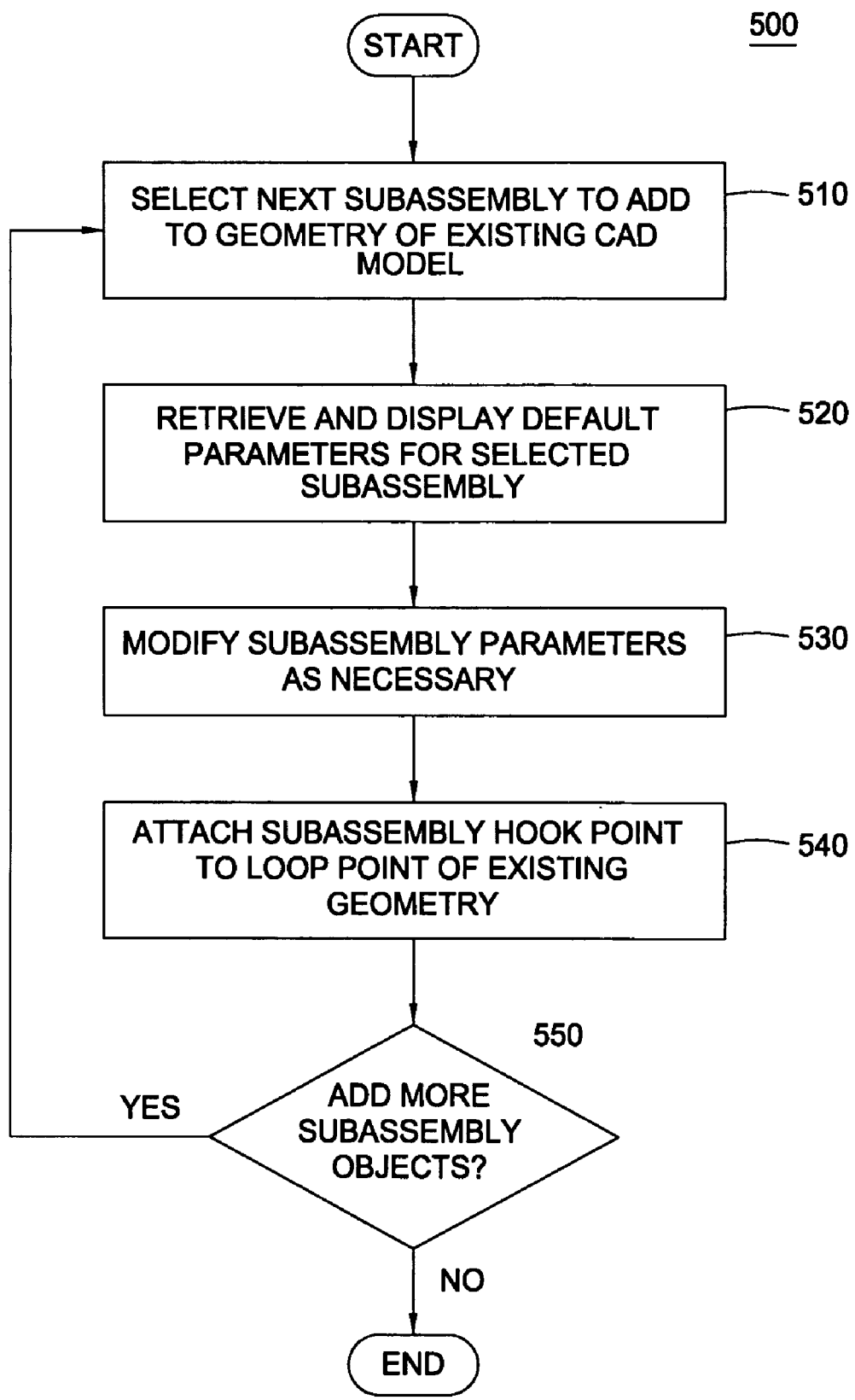
FIG. 5 is a flow chart illustrating a method for adding a subassembly element to a CAD model of a longitudinal structure, according to one embodiment of the invention.

FIG. 5 is a flow chart illustrating a method 500 for adding a subassembly element to the geometry of an existing CAD model, according to one embodiment of the invention. The operations of method 500 are described in reference to the graphical user interface screen illustrated in FIG. 6. The method 500 begins at step 510 when a user selects a subassembly (e.g., one of subassembly elements $410_{1-6}$ using i-drop icon $415_{1-6}$) from the subassembly catalog display 120 to integrate into a cross-section of an existing CAD model.

FIG. 6 illustrates an exemplary graphical user interface screen for adding a subassembly element to the CAD model of a longitudinal structure, according to one embodiment of the invention. As shown, FIG. 6 illustrates screen 600 of the CAD model geometry display 125 after a user has selected to add a basic lane subassembly $410_2$ to the geometry of an existing cross-section 625. The subassembly $410_2$ includes the hook point 610, which may be used to drag the subassembly using mouse cursor 605. For example, a user may move the mouse cursor 605 to attach the hook point 610 to one of the loop points 615. The existing cross-section 625 includes three subassemblies already added to the existing geometry. In addition, centerline 620 provides a reference point for the geometry of the current cross-section. In this case, centerline 620 represents a center of the cross-section.

In one embodiment, as subassemblies are added to a cross-section, they are associated with a group. The centerline divides the current cross-section into two groups, one the left and one on the right side. Depending on the complexity of the structure being modeled, additional subassembly groups may be defined. On the right side of the centerline 620, the geometries for subassemblies for a curb, a gutter, and a roadway lane are present in the existing geometry. In this illustration, the roadway lane is being added to the left side group of the current cross-section.

Returning to the method 500 illustrated in FIG. 5, after a user drags a selected subassembly into the existing geometry, at step 520, the design application program 105 retrieves the default parameters for the selected subassembly and displays these values. For example, the parameter display dialog 635 shown in FIG. 6, illustrates the default parameters for the basic lane subassembly $410_2$. Illustratively, the default parameters for the basic lane assembly include a version, a side, a width, a depth, and a slope. At step 530, a user may select to modify the default subassembly parameters to create the geometry for the selected subassembly. For example, if a user changed the "side" parameter from "left" to "right" the lane would flip to represent a lane sloping downward to the right of the cursor, allowing a user to add the basic lane subassembly $410_2$ to the right side group of this cross-section.

At step 540, a user selects which loop point of the existing geometry to attach the hook point of the selected subassembly being added to the cross-section. In one embodiment, as a user moves the basic subassembly within in the display of the current cross-section, when the hook point is placed near a loop point, the interface snaps the subassembly into place with the proximal loop point. In one embodiment, the CAD environment 100 may include a configurable parameter defining the required proximity between a loop point and a hook point for the subassembly to snap into place. At step 550, once the selected subassembly is attached to a selected loop point, if the user desires to add additional subassemblies to the current CAD model, then the method 500 returns to step 510, otherwise the method 500 terminates.

FIG. 7 illustrates a method 700 for integrating a subassembly element into an existing CAD model of a longitudinal structure, according to one embodiment of the invention. The method 700 begins where a user selects a basic subassembly from assembly catalog display 120. For example, a user may select a subassembly by positioning a mouse cursor over the i-drop icon 415 for a selected subassembly, clicking down a mouse button, and dragging the subassembly into the entity geometry display 135. At step 710, the interface 115 paints a representation the selected subassembly by generating a geometry for the subassembly using its associated default parameters. If a user selects to change the subassembly parameters, then the design application 105 may be configured to re-execute the subassembly generation logic 305 using the modified parameters to redefine the geometry of the subassembly.

At step 720, the graphical user interface 100 determines whether the hook point of the selected subassembly is near a loop point of a subassembly in the current cross-section. If so, at step 730, the interface graphical user 110 may be configured to snap the subassembly to the proximal loop point. By "snap" it is meant that the position of the subassembly and mouse cursor on model geometry display 125 is moved for a starting location to an ending location linking the hook point of the subassembly to the proximal loop point, without showing a smooth animation moving from the starting location to the ending location. This allows users to place the selected subassembly into the current cross-section, without having to meticulously align the two. At step 740, the method confirms that the interface has "snapped" the subassembly to the correct loop point. For example, the user may be required to hold down a mouse button to move a selected subassembly within the display, and confirm an ending location by releasing the mouse button. When a user releases the mouse button, the subassembly is placed into the CAD model based on its current on-screen position.

At step 750, the design application program 105 integrates the geometry generated for the subassembly into the geometry of the current cross-section of the CAD model. For example, the structure geometry database 135 may be updated with the geometry data generated by logic 305 and parameters 310, along with an indication of the links between loop points created by snapping the subassembly in to the current cross-section. Once integrated, at step 760, if a user selects to add additional subassemblies to the existing CAD model, then the method returns to step 710, otherwise the method 700 reaches an endpoint.

FIG. 8 illustrates the model geometry display 125 after a user has completed a cross-section of the roadway lane using the techniques and methods described above. As illustrated, centerline 620 indicates the geometric center of the roadway lane from a longitudinal perspective. To the left of centerline 620 is a left assembly group 810 that includes a left curb subassembly 820, gutter subassembly 830, and a left lane subassembly 840, to the right of centerline 620 is a right assembly group 850 that includes a right curb subassembly 860, gutter subassembly 870, and a left lane subassembly 880.

The geometry for each individual subassembly in the CAD model is generated according to the parameters and generation logic, as modified by the user, to reflect the desired geometry. In addition to allowing users to modify subassemblies as they are being added to a cross-section, the graphical user interface 110 may further allow users to pull a particular subassembly out of an existing CAD model and modify the parameters 310 used to generate its geometry. For example, in one embodiment, a user may select to modify an existing subassembly by double-clicking the subassembly in the model geometry display 125.

In sum, the drag-and-drop technique, combined with the ability to customize a catalog of individual subassemblies, advantageously allows users to rapidly develop a CAD model of a longitudinal structure composed as a series of repeating cross-sections.

While the foregoing is directed to embodiments of the present invention, other and further embodiments of the invention may be devised without departing from the basic scope thereof, and the scope thereof is determined by the claims that follow.

What is claimed is:

1. A computer-implemented method for building a three-dimensional (3D) computer model of a longitudinal structure using a graphical user interface display, comprising:

providing a catalog of two-dimensional (2D) subassemblies, wherein each 2D subassembly is represented as a data component that stores modifiable parameters, and a logic component that generates a parameter-specific geometry of the 2D subassembly for use in a 2D cross-sectional representation of the 3D computer model;

displaying an image associated with a first 2D subassembly in a first portion of the graphical user interface display;

displaying the 2D cross-sectional representation of the 3D computer model in a second portion of the graphical user interface display;

detecting that the image associated with the first 2D subassembly is dragged and dropped from the first portion of the graphical user interface display to the second portion of the graphical user interface display;

in response to the detecting, executing the logic component associated with the first 2D subassembly to generate the parameter-specific geometry for the first 2D subassembly based on default parameter values associated with the first 2D subassembly; and the first 2D subassembly based on default parameter values associated with the first 2D subassembly; and integrating the first 2D subassembly into the 2D cross-section of the 3D computer model based on the parameter-specific geometry.

2. The method of claim 1, wherein the parameter-specific geometry of the first 2D subassembly includes point, link, and shape information generated from the modifiable parameters by the logic component.

3. The method of claim 2, wherein point information specifies locations on the first 2D subassembly where the first 2D subassembly is able to be connected to other 2D subassemblies, link information specifies linear connectivity between at least two point locations of the first 2D subassembly, and wherein shape information defines at least one closed shape formed from the link information.

4. The method of claim 1, wherein integrating the first 2D subassembly into the 2D cross-section of the 3D computer model comprises, aligning, in response to a user selection, an on-screen display image of a hook point associated with the first 2D subassembly with a loop point associated with a second 2D subassembly present in the 3D computer model.

5. The method of claim 4, wherein the graphical user interface display is configured to snap the on-screen display image of the hook point associated with the first 2D subassembly to a loop point associated with the second 2D subassembly, whenever the hook point is moved to a location within a specified distance from the loop point associated with the second 2D subassembly.

6. The method of claim 1, further comprising the steps of:

retrieving the default parameter values associated with the first 2D subassembly;

displaying the default parameter values in a third portion of the graphical user interface display; and receiving a user modification to modify at least one default parameter value to a modified parameter value, wherein generating the parameter-specific geometry for the first 2D subassembly is based on the modified parameter value.

7. A computer-readable storage medium storing a program that when executed by a processor, causes a computer system to perform operations for building a 3D computer model of a longitudinal structure, by performing the steps of:

providing a catalog of 2D subassemblies, wherein each 2D subassembly is represented as a data component that stores modifiable parameters, and a logic component that generates a parameter-specific geometry of the 2D subassembly for use in a 2D cross-sectional representation of the 3D computer model;

displaying an image associated with a first 2D subassembly in a first portion of a graphical user interface display;

displaying the 2D cross-sectional representation of the 3D computer model in a second portion of the graphical user interface display;

detecting that the image associated with the first 2D subassembly is dragged and dropped from the first portion of the graphical user interface display to the second portion of the graphical user interface display;

in response to the detecting, executing the logic component associated with the first 2D subassembly to generate the parameter-specific geometry for the first 2D subassembly based on default parameter values associated with the first 2D subassembly; and the first 2D subassembly based on default parameter values associated with the first 2D subassembly; and integrating the first 2D subassembly into the 2D cross-section of the 3D computer model based on the parameter-specific geometry.

8. The computer-readable storage medium of claim 7, wherein the parameter-specific geometry of the first 2D subassembly includes point, link, and shape information generated from the modifiable parameters by the logic component.

9. The computer-readable storage medium of claim 8, wherein point information specifies locations on the first 2D subassembly where the first 2D subassembly is able to be connected to other 2D subassemblies, link information specifies linear connectivity between at least two point locations of the first 2D subassembly, and wherein shape information defines at least one closed shape formed from the link information.

10. The computer-readable storage medium of claim 7, wherein the graphical user interface display is configured to align, in response to a user selection, an on-screen display image of a hook point associated with the first 2D subassembly with a loop point associated with a second 2D subassembly present in the 3D computer model.

11. The computer-readable storage medium of claim 10, wherein the graphical user interface display is further configured to snap the on-screen display image of the hook point associated with the first 2D subassembly to a loop point associated with the second 2D subassembly, whenever the hook point is moved to a location within a specified distance from the loop point associated with the second 2D subassembly.

12. The computer-readable storage medium of claim 7, wherein the program when executed by the processor, further causes the computer system to perform operations for building the 3D computer model, by performing the steps of:

retrieving the default parameter values associated with the first 2D subassembly;

displaying the default parameter values in a third portion of the graphical user interface display; and receiving a user modification to modify at least one default parameter value to a modified parameter value, wherein generating the parameter-specific geometry for the first 2D subassembly is based on the modified parameter value.

13. A computer aided design (CAD) system for building a 3D computer model of a longitudinal structure, comprising:
a processor;
a memory storing a design application program;
a display device;
a 2D subassembly database, wherein each 2D subassembly in the database includes a data component that stores modifiable parameters, and a logic component that generates a parameter-specific geometry of the 2D subassembly for use in a 2D cross-sectional representation of the 3D computer model; and
a computer model database that stores the parameter-specific geometry of each 2D subassembly in the 3D computer model;
wherein the design application program when executed by the processor is configured to:
display, on the display device, an image associated with a first 2D subassembly in a first portion of a graphical user interface associated with the design application program,
display, on the display device, the 2D cross-sectional representation of the 3D computer model in a second portion of the graphical user interface,
detect that the image associated with the first 2D subassembly is dragged and dropped from the first portion of the graphical user interface to the second portion of the graphical user interface,
in response to the detecting, cause the logic component associated with the first 2D subassembly to be executed to generate a first parameter-specific geometry associated with the first 2D subassembly based on default parameter values associated with the first 2D subassembly, and cause the first 2D subassembly to be integrated into the 2D cross-section of the 3D computer model based on the first parameter-specific geometry.

14. The system of claim 13, wherein the first parameter-specific geometry associated with the first 2D subassembly includes point, link, and shape information generated from the modifiable parameters by the logic component.

15. The system of claim 14, wherein point information specifies locations on the first 2D subassembly where the first 2D subassembly is able to be connected to other 2D subassemblies, link information specifies linear connectivity between at least two point locations of the first 2D subassembly, and wherein shape information defines at least one closed shape formed from the link information.

16. The system of claim 13, wherein the design application program is further configured to, in response to user input, align an on-screen display image of a hook point associated with the first 2D subassembly to a loop point associated with a second 2D subassembly present in an existing 3D computer model.

17. The system of claim 16, wherein the design application program is further configured to snap the on-screen display image of the hook point associated with the first 2D subassembly to a loop point associated with the second 2D subassembly, whenever the hook point is moved to a location within a minimal distance from the loop point associated with the second 2D subassembly.

18. The system of claim 13, wherein the design application program is further configured to:
retrieve the default parameter values associated with a first 2D subassembly;
display the default parameter values in a third portion of the graphical user interface; and
receive a user modification to modify at least one default parameter value to a modified parameter value, wherein generating the first parameter-specific geometry associated with the first 2D subassembly is based on the modified parameter value.

* * * * *

UNITED STATES PATENT AND TRADEMARK OFFICE
CERTIFICATE OF CORRECTION

| | | |
|---|---|---|
| PATENT NO. | : 7,599,820 B2 | Page 1 of 1 |
| APPLICATION NO. | : 11/165319 | |
| DATED | : October 6, 2009 | |
| INVENTOR(S) | : Inzinga et al. | |

It is certified that error appears in the above-identified patent and that said Letters Patent is hereby corrected as shown below:

In column 10, line 27, please replace "the first 2D subassembly; and the first 2D subassembly based on default parameter values associated with the first 2D subassembly; and integrating the first 2D subassembly" with -- the first 2D subassembly; and integrating the first 2D subassembly --.

Signed and Sealed this
Eighteenth Day of October, 2011

David J. Kappos
*Director of the United States Patent and Trademark Office*